United States Patent [19]
Yoneda

[11] Patent Number: 5,058,188
[45] Date of Patent: Oct. 15, 1991

[54] MANUAL SCAN TYPE IMAGE READER FOR CORRECTING READ IMAGE DATA TO FAITHFULLY REPRODUCE READ IMAGE

[75] Inventor: Shigeo Yoneda, Yamatokouriyama, Japan

[73] Assignee: Kabushiki Kaisha, Osaka, Japan

[21] Appl. No.: 609,517

[22] Filed: Nov. 5, 1990

[30] Foreign Application Priority Data

Nov. 10, 1989 [JP] Japan .................................. 1-293388

[51] Int. Cl.$^5$ .............................................. G06K 9/22
[52] U.S. Cl. ..................................... 382/59; 358/473; 358/474; 235/442
[58] Field of Search ................ 358/473, 474; 250/557, 250/561; 235/436, 472, 483–486; 382/58, 59, 65

[56] References Cited

U.S. PATENT DOCUMENTS

| | | | |
|---|---|---|---|
| 4,420,682 | 12/1983 | Huber | 235/472 |
| 4,445,028 | 4/1984 | Huber | 235/472 |
| 4,819,308 | 4/1989 | Kawai et al. | 382/59 |
| 4,894,730 | 1/1990 | Yanagawa et al. | 382/59 |
| 4,901,163 | 2/1990 | Tsujioka et al. | 382/59 |

FOREIGN PATENT DOCUMENTS

| | | |
|---|---|---|
| 57-7674 | 1/1982 | Japan . |
| 57-37972 | 3/1982 | Japan . |
| 57-52968 | 3/1982 | Japan . |
| 58-29073 | 2/1983 | Japan . |

Primary Examiner—David K. Moore
Assistant Examiner—Jose L. Couso
Attorney, Agent, or Firm—Nixon & Vanderhye

[57] ABSTRACT

Thers is disclosed a manual scan type image reader for reading a document image by manually moving an image sensor for optically reading the image in a predetermined manual scan direction, converting the read document image into document image data, and outputting the converted document image data to an external unit. In the image reader, there is provided a ruler body including an image reading window for seeing the image therethrough formed on a bottom surface thereof so as to be opened to a top surface thereof, and plural scale lines printed with predetermined equal pitches in the manual scan direction on a bottom surface thereof. A scanner is mounted on the ruler body for movement in the manual scan direction, and the scanner includes the image sensor for reading the document image and the plural scale lines and converting them into document image data and scale image data, respectively. An image reading controller of the image reader corrects the document image data converted by the image sensor according to the scale image data converted by the image sensor so as to reproduce further document image data corresponding to the document image with predetermined equal pitches between the adjacent scale lines of the converted scale image data.

9 Claims, 8 Drawing Sheets

MANUAL SCAN TYPE IMAGE READER FOR CORRECTING READ IMAGE DATA TO FAITHFULLY REPRODUCE READ IMAGE

BACKGROUND OF THE INVENTION

1. Field of the Invention

The present invention relates to an image reader, and particularly, to a manual scan type image reader for optically reading an image of a document (referred to as a document image hereinafter) etc. by a manual scan, converting the read image into image data, correcting the image data so as to faithfully reproduce the read image, and outputting the corrected image data to an external unit such as a personal computer.

2. Description of the Related Art

A conventional manual scan type image reader which is called an image scanner generally comprises a rotary encoder shown in FIG. 5 for detecting a position of a CCD image sensor for reading an image when the CCD image sensor is moved by a manual scan since a scan speed thereof is not constant.

Referring to FIG. 5, the rotary encoder is provided at the end portion of a scanner (not shown) comprising an image reading section composed of an optical system and a CCD image sensor. In the rotary encoder, a rubber roller 1 is rotated on a surface of a document to be read when the scanner is moved by the manual scan, and the turning force of the rubber roller 1 is transmitted to a slit circular plate 3 through a rubber belt 2. In the slit circular plate 3, there are formed plural slits radially and at equal spaces, and a transparent type photointerruptor 4 comprising a light emitting diode (referred to as an LED hereinafter) 4a and a phototransistor 4b is provided so as to oppose to the slit circular plates 3 through a slit body 5 for passing therethrough a beam of light projected from the LED 4a to the slit circular plate 3 and a beam of light reflected from the slit circular plate 3 to the phototransistor 4b. When a beam light emitted from the LED 4a of the transparent type photointerruptor 4 is projected through the slit body 5 onto the slit circular plate 3, the projected beam of light therefrom is reflected by the slit circular plate 3 and the reflected beam of light is projected through the slit body 5 onto the phototransistor 4b of the photointerruptor 4, and then, a detection signal for representing the position of the scanner which is moved by the manual scan is outputted to the CCD image sensor. On the other hand, the CCD image sensor reads the document image in synchronization to the detection signal, converts it into an electric image signal and outputs the electric image signal to an external unit such as a personal computer.

However, since the above-mentioned rotary encoder is constituted by mechanical rotation members such as the rubber roller 1 and the slit circular plate 3, the precision of the rotation ratio of the number of rotation per a unit time of the rubber roller 1 to that of the slit circular plate 3 is lowered if, for example, the rubber belt 2 for transmitting the turning force from the rubber roller 1 to the slit circular plate 3 expands and contracts. In this case, there is such a problem that image information of the document image can not correctly outputted to the personal computer.

Further, since a dimension of the rotary encoder itself is relatively large, it is difficult to miniaturize it, resulting in such a problem that the rotary encoder is not suitable for a handy type image scanner.

SUMMARY OF THE INVENTION

An essential object of the present invention is to provide an image reader capable of detecting a position of a scanner which is moved by a manual scan with a higher precision, and also capable of being miniaturized as compared with the conventional image reader.

Another object of the present invention is to provide an image reader capable of faithfully reproducing image data of a read document image after reading the document image by a manual scan.

In order to accomplish the above objects, according to one aspect of the present invention, there is provided an image reader for reading a document image by manually moving an image sensor for optically reading said image in a predetermined manual scan direction, converting said read document image into document image data, and outputting said converted document image data to an external unit, comprising:

a ruler body including an image reading window for seeing said image therethrough, said image reading window being formed on a bottom surface thereof so as to be opened to a top surface thereof, and plural scale lines printed with predetermined equal pitches in said manual scan direction on a bottom surface thereof;

a scanner mounted on said ruler body for movement in said manual scan direction, said scanner including said image sensor for reading said document image and said plural scale lines and converting them into document image data and scale image data, respectively, said image sensor being mounted on said scanner so as to oppose to said image reading window and said plural scale lines; and image correction means for correcting said document image data converted by said image sensor according to said scale image data converted by said image sensor so as to reproduce further document image data corresponding to said document image with predetermined equal pitches between said adjacent scale lines of said converted scale image data.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENTS

A manual scan type image reader of a preferred embodiment according to the present invention will be described below with reference to the attached drawings.

Figure 1:
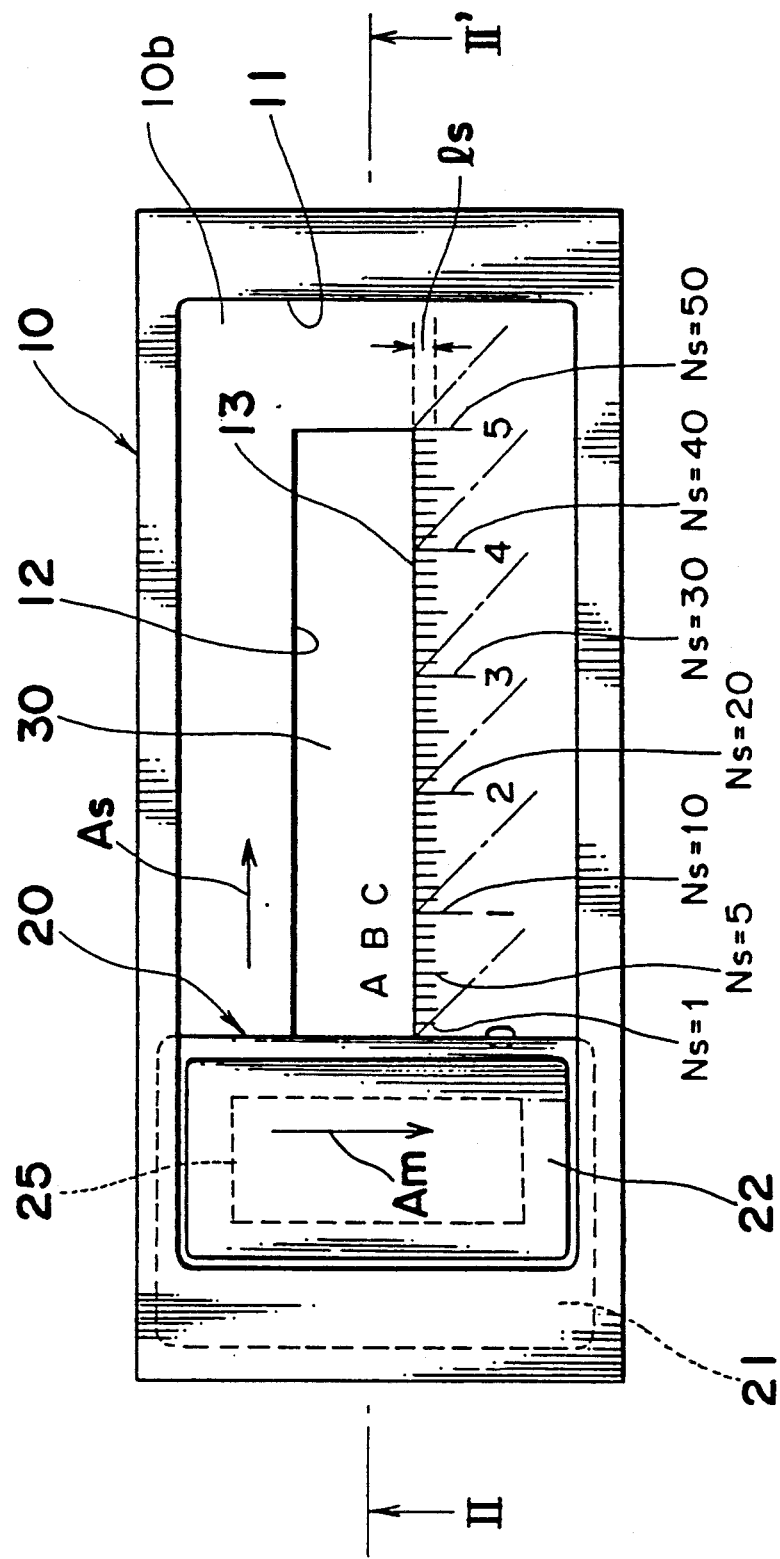
FIG. 1 is a front view of a manual scan type image reader of a preferred embodiment according to the present invention.
Figure 2:
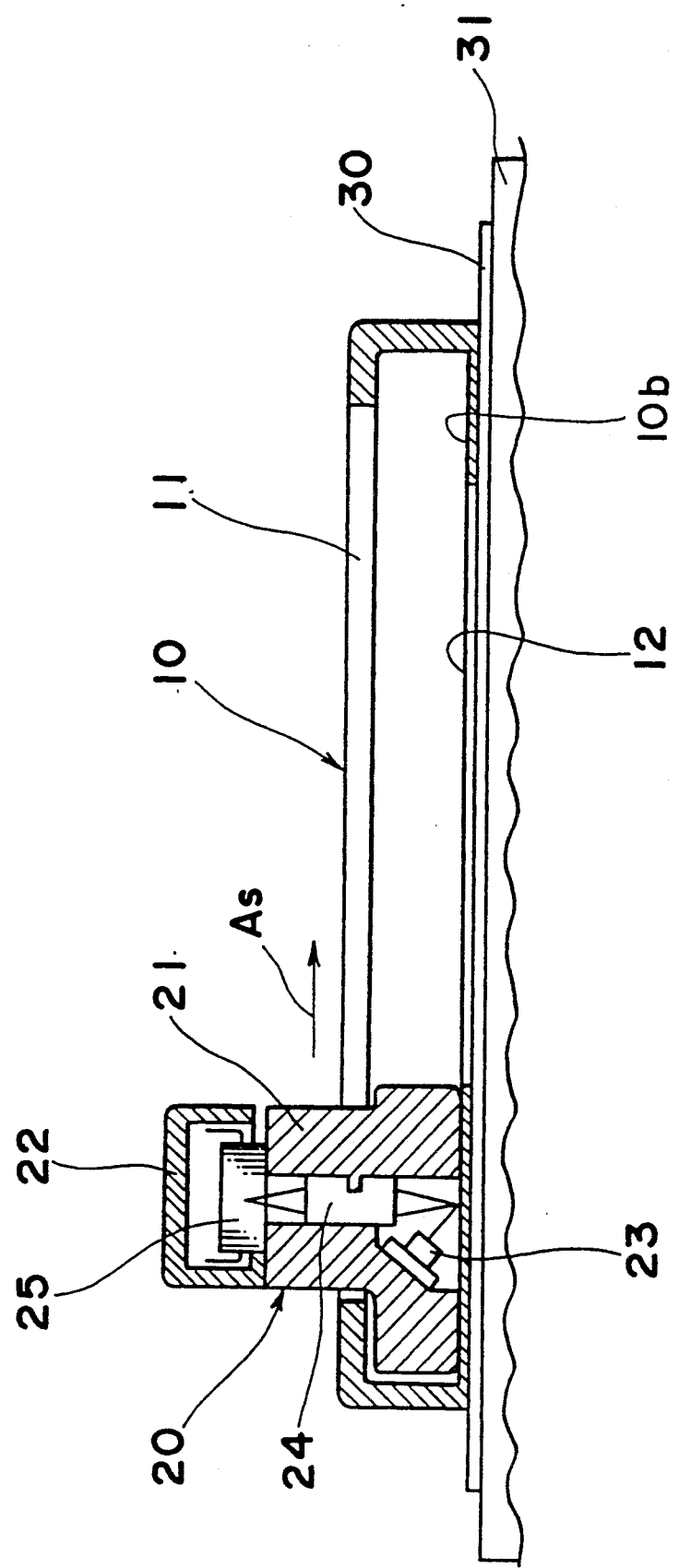
FIG. 2 is a cross sectional view of the image reader taken on line II—II' of FIG. 1.

FIG. 1 is a front view of the manual scan type image reader of the present preferred embodiment, and FIG. 2 is a longitudinal cross sectional view thereof taken on line II—II' of FIG. 1.

Referring to FIGS. 1 and 2, the image reader of the present preferred embodiment comprises a ruler body 10 and a scanner 20.

The ruler body 10 has a shape of rectangular parallelepiped box. A rectangular guiding hole 11 for guiding the scanner 20 in the longitudinal direction of the ruler body 10 is formed on the top surface of ruler body 10 in the longitudinal direction of the ruler body 10 so as to have a thickness smaller than that of the ruler body 10, and a rectangular image reading window 12 for reading a document is formed in the bottom surface of ruler body 10 so as to be opened to the top surface of the ruler body 10, wherein the window 12 has longitudinal sides parallel to the longitudinal direction of the ruler body 10. Plural scale lines of a scale 13 used upon detecting a position of the scanner 20 each scale line having a length of at least $l_s$ are printed on a top side of a bottom surface 10b of the ruler body 10 in the lateral direction perpendicular to the longitudinal direction of the ruler body 10 or a main scan direction at equal pitches each pitch being 1 mm. In the present preferred embodiment, when the scanner 20 is located at the leftmost position thereof (referred to as a home position hereinafter). In FIG. 1, Ns denotes a serial number of a scale line which is counted from the leftmost scale line.

Figure 3:
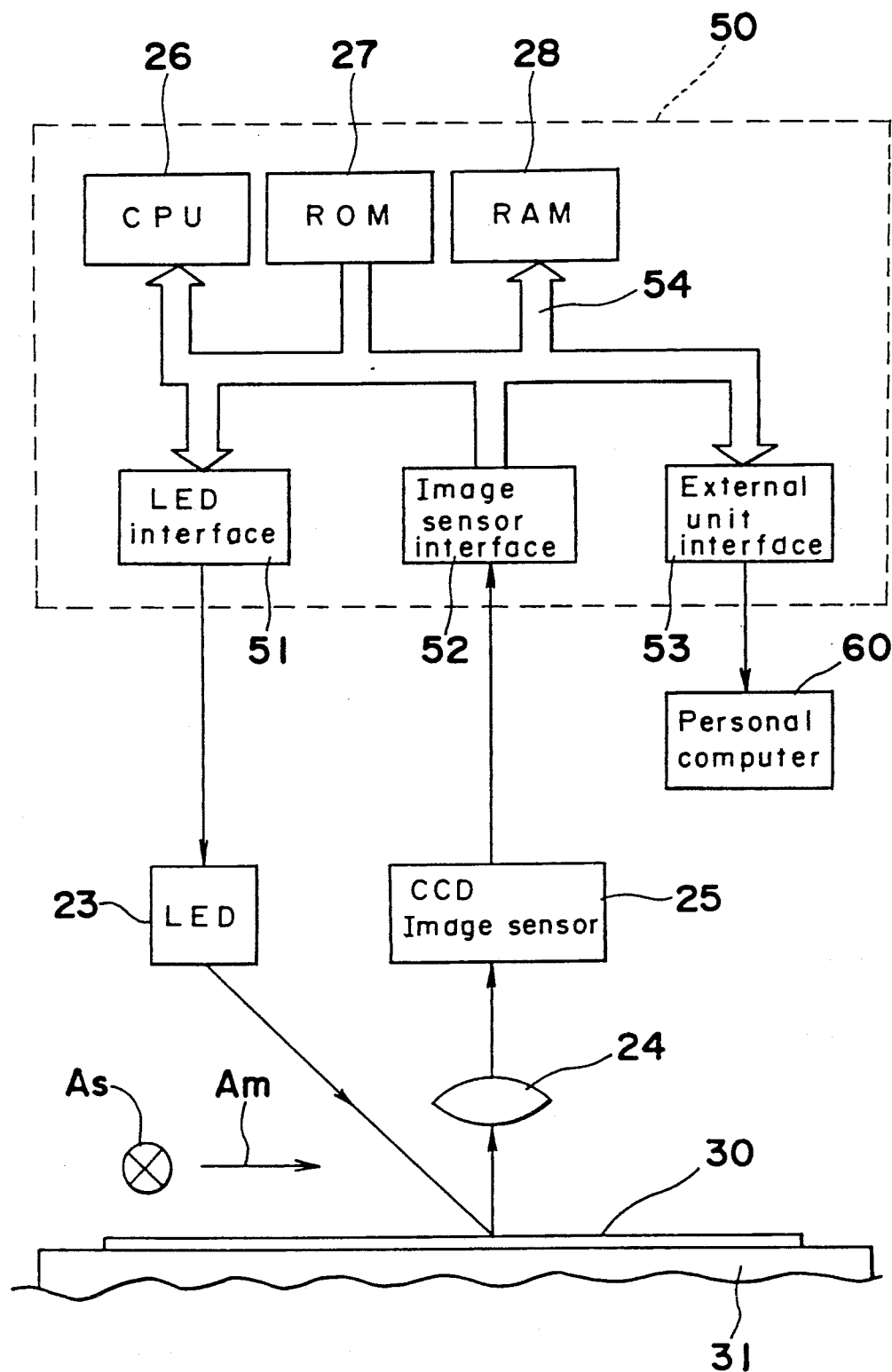
FIG. 3 is a schematic block diagram showing a composition of the image reader shown in FIGS. 1 and 2.

The scanner 20 comprises a casing 21 mounted in the guiding hole 11, and a handle member 22 formed on the casing 21 so as to project upward from the guiding hole 11, and the scanner 20 is integrally mounted for movement along the guiding hole 11 in the longitudinal direction of the ruler body 10 or in a subscan direction as indicated by an arrow As on the ruler body 10. Referring to FIG. 3, there are mounted inside of the scanner 20 an optical image reading system comprising an LED 23 for emitting a beam of light so as to project it onto a document 30 set on a document table 31, a focusing lens 24 for focusing the light reflected from the document 30 onto a CCD image sensor 25, and the CCD image sensor 25 for optically reading an image of the document 30 and an image of the scale lines of the scale 13 and converting the read images into an electric image signal so that the light reflected from the document 30 and all the ruler lines of the scale 13 can be projected onto the CCD image sensor 25 or the CCD image sensor 25 can read the images of the document 30 and the scale lines of the scale 13.

FIG. 3 is a schematic block diagram showing a composition of a signal processing system of the image reader shown in FIGS. 1 and 2.

Referring to FIG. 3, an image reading controller 50 comprises a central processing unit (referred to as a CPU hereinafter) 26 for controlling the whole operation of the image reader shown in FIGS. 1 and 2 according to a system program stored in a ROM 27, the ROM 27 for storing the above-mentioned system program and storing data necessary for executing the above-mentioned system program, a RAM 28 for being used as a working area and storing data and parameters to be temporarily stored, an LED interface 51 connected to the LED 23, an image sensor interface 52 connected to the CCD image sensor 25, and an external unit interface 53 connected to a personal computer 60, which are connected through a bus 54. The CPU 26 outputs a light emitting signal to the LED 23 through the LED interface 51 so as to turn on the LED 23 with a predetermined period and project a beam of light modulated in a predetermined manner onto the document 30. The beam of light reflected from the document 30 is incident onto the CCD image sensor 25 through the focusing lens 24, and then, the CCD image sensor 25 reads the document image and converts the read document image into an electric image signal, which is outputted to the image sensor interface 52 of the image reading controller 50. Thereafter, the CPU 26 of the image reading controller 50 stores in the RAM 28 image data Di of the converted electric image signal including document image data Dg and scale image data Dm which are inputted to the image sensor interface 52, temporarily, and then, the CPU 26 reads out the image data Di from the RAM 28 and corrects them so as to convert them into corrected image data Dic including corrected document image data $D_G$ and corrected scale image data $D_M$ in an image correction process shown in FIG. 8 as described in detail later. Thereafter, the corrected data Dic are temporarily stored in the RAM 28, and then, are outputted to the personal computer 60.

The action of the image reader of the preferred embodiment will be described below.

An operator repositions and arranges the image reader shown in FIGS. 1 and 2 on the document 30 so as to see a document image of the document 30 to be read within the window 12. Thereafter, the operator holds the handle member 22 of the scanner 20 and moves the scanner 20 along the longitudinal sides of the guiding hole 11 in the subscan direction as indicated by an arrow As holding the handle member 22. Upon the movement of the scanner 20, the modulated light emitted from the LED 23 is projected onto the document 30, and a light (referred to as a reflected light hereinafter) corresponding to the document image of the document 30 which has been reflected from the document 30 is focused onto the CCD image sensor 25 by the focusing lens 24, and then, the reflected light is incident onto the CCD image sensor 25 in synchronization with the light emission of the LED 23 by the control of the CPU 26 so that the document image located within the window 12 are scanned and optically read. At the same time, the scale lines of the scale 13 are read in a manner similar to that described above in the case of reading the document image. Then, data Di of both of the read document image data Dg and the read scale image data Dm are transferred in the RAM 28 so as to store them in the RAM 28, temporarily.

Figure 4A:
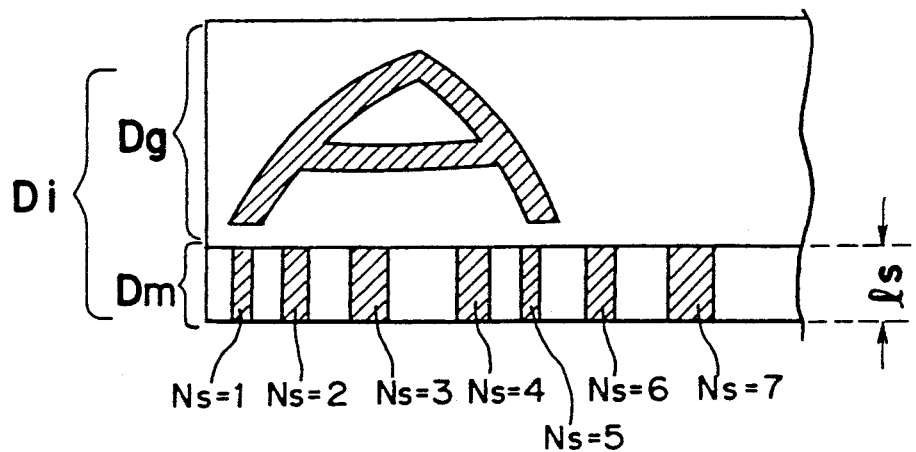
FIG. 4a is a front view showing image data Di including document image data Dg and scale image data Dm which are stored in a RAM shown in FIG. 3 after reading an document image including a document image and a scale image in an image reading process shown in FIG. 7.
Figure 4B:
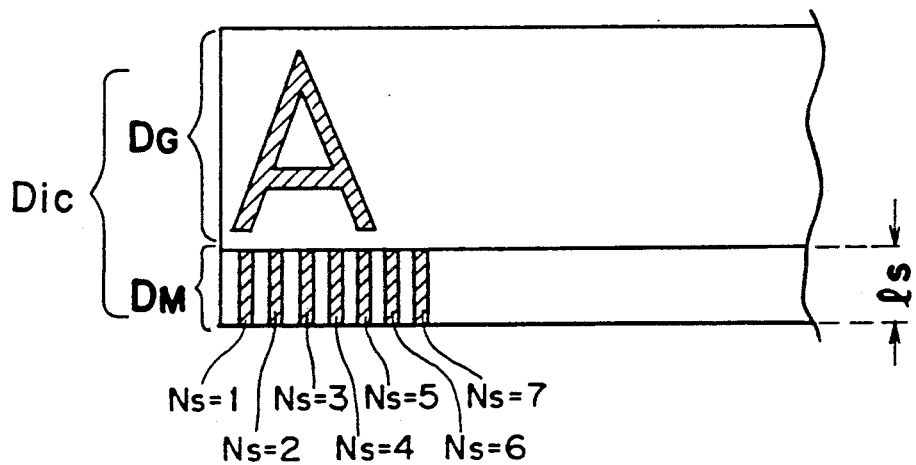
FIG. 4b is a front view showing image data Dic including document image data $D_G$ and scale image data $D_M$ which are stored in a RAM shown in FIG. 3 after correcting the read document image Di including the read document image Dg and the read scale image Dm in an image correction process shown in FIG. 8.
Figure 5:
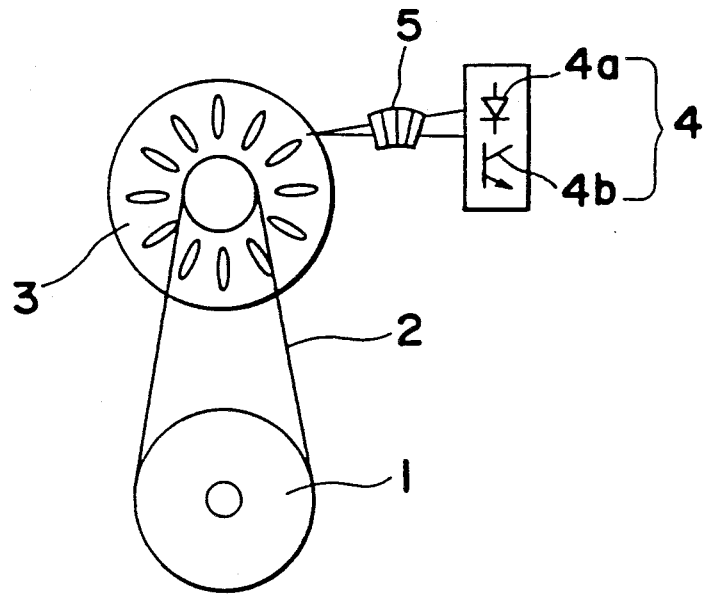
FIG. 5 is a schematic side view of a rotary encoder for a conventional image reader.

As shown in FIG. 4a, an image of the document image data Dg and an image of the scale image data Dm may expand and/or contract due to a dispersion of the moving speed of the scanner 20 by the manual scan so as to be deformed as compared with the original document image. Thereafter, after reading the image of the image data Di, the CPU 26 reads out the data Di composed of the document image data Dg and the scale image data Dm from the RAM 28, and then, the CPU 26 executes the image correction process shown in FIG. 8. Namely, in the image correction process, according to the system program stored in the ROM 27, the CPU 26 transforms the read scale image data Dm into corrected scale image data $D_M$ shown in FIG. 4b wherein the scale lines thereof are arranged at predetermined equal pitches, and also transforms the read document image data Dg into corrected document image data $D_M$ shown in FIG. 4b corresponding to the original document image of the document 30 with reference with the transformed scale image data $D_M$. Thus, the read document image data Dg can be correctly restored to the document data $D_G$ corresponding to the original document image of the document 30.

Figure 6:
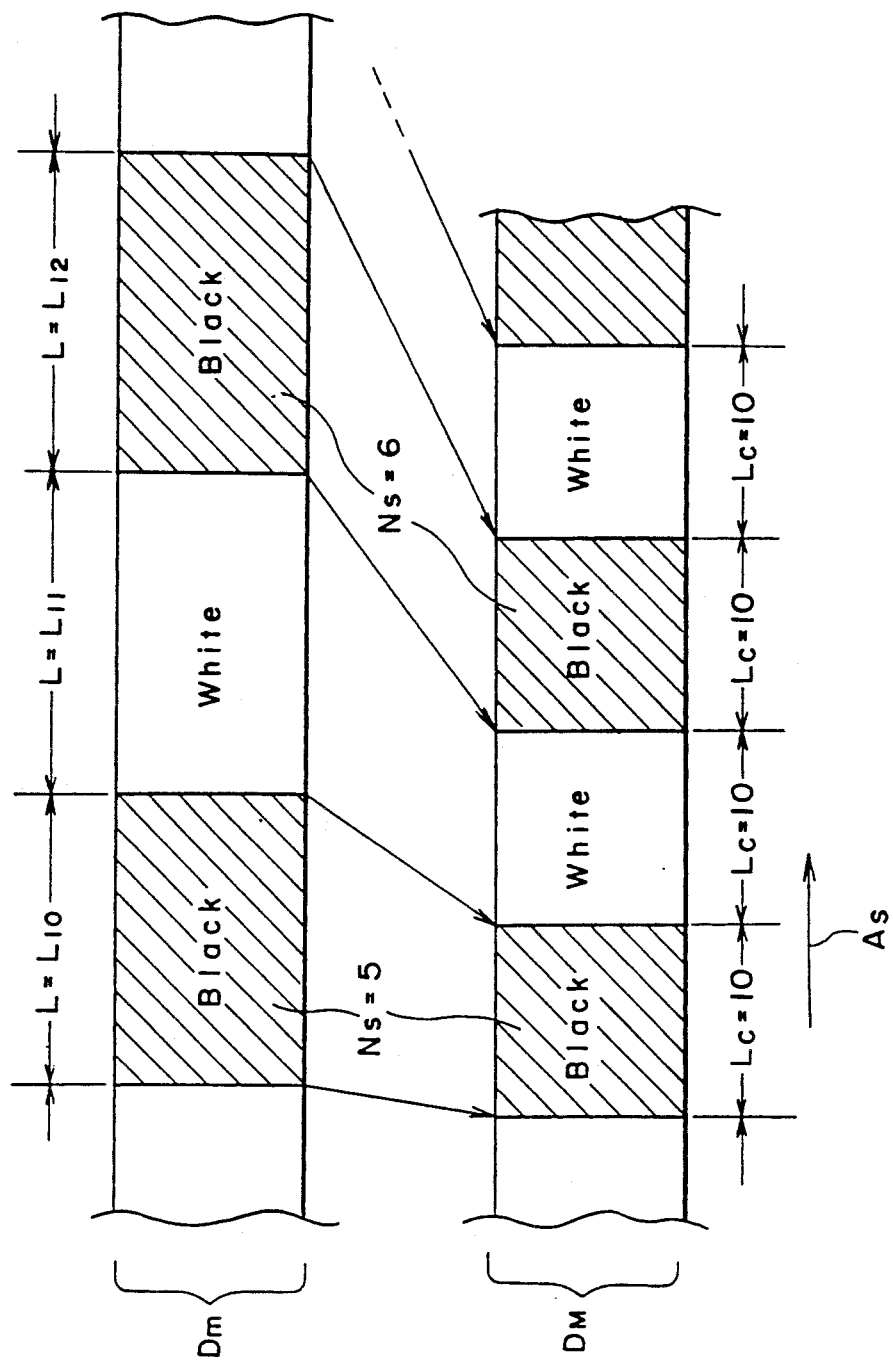
FIG. 6 is a front view showing examples of the read scale image data Dm and the corrected scale image data $D_M$.

FIG. 6 shows an example of correcting the scale image data Dm so as to transform them into corrected image data $D_M$.

In the scale image data Dm of FIG. 6, there are shown only a fifth black scale line (Ns=5), a sixth black scale line (Ns=6) and white image located between the adjacent fifth and sixth scale lines. If respective widths in the subscan direction indicated by the arrow As of these scale lines and the white image are represented in a unit of the number of scanning lines, the width of the fifth scale line is $L=L_{10}$ scan lines, the width of the white image located between the fifth and sixth scale lines is $L=L_{11}$ scan lines, and the width of the sixth scale line is $L=L_{12}$ scan lines. In this example, the image data Dm composed of respective black scale lines and white image are transformed to corrected image data $D_M$ composed of black scale lines and white image so that the width of each transformed black scale line or each transformed white image becomes substantially the same scan lines of Lc=10.

Figure 7:
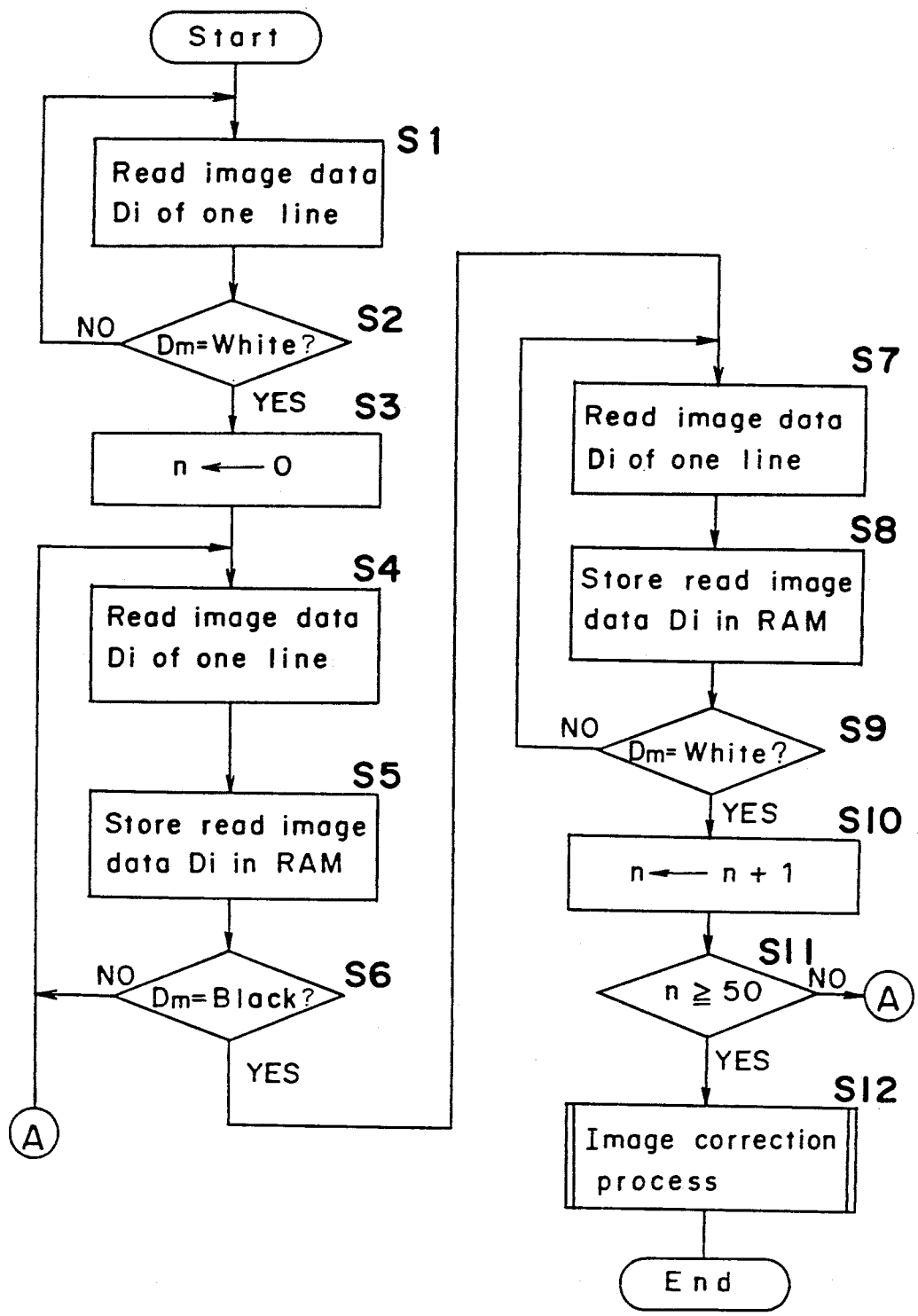
FIG. 7 is a flowchart showing a main routine of the image reading process of the preferred embodiment according to the present invention.

FIG. 7 is a flowchart showing a main routine of the image reading process including the image correction process which is executed by the CPU 26 of the image reading controller 50.

In FIG. 7, a process of steps S1 to S11 is the image reading process, and a process of steps S12 is the image correction process. It is to be noted that a document 30 to be read is repositioned within the window 12 on the document table 31 by the operator so that an image such as characters, graphic image can be seen through the window 12 prior to starting the main routine thereof.

Referring to FIG. 7, first of all, when a main switch (not shown) or a reset switch (not shown) is turned on, the main routine of the CPU 26 is started, and then, a document image and a scale image of one scanning line are read so as to convert them into image data Di composed of the document image data Dg and the scale image data Dm in the RAM 28 at step S1. Thereafter, it is judged at step S2 whether or not the image of the read scale image data Dm is a white image. If the image of the read scale image data Dm is not a white image (No at step S2), the program flow goes back to step S1, the operator moves the scanner 20 by one scanning line in the subscan direction indicated by the arrow As, and then, the above image reading process of step S1 is repeated. On the other hand, if the image of the read scale image data Dm is a white image (Yes at step S2), the program flow goes to step S3, and then, a scanning line parameter n is reset to zero.

Thereafter, the operator moves the scanner 20 by one scanning line in the subscan direction indicated by the arrow As, and then, a document image and a scale image of the subsequent one scanning line are read so as to convert them into image data Di composed of the document image data Dg and the scale image data Dm at step S4, and then, the converted image data Di are stored in the RAM 28 at step S5. Thereafter, it is judged at step S6 whether or not the image of the stored scale image data Dm is a black image. If the image of the stored scale image data Dm is not a black image (No at step S6), the program flow goes back to step S4, the operator the scanner 20 is moved by one scanning line in the subscan direction indicated by the arrow As, and then, the above image reading process of steps S4 and S5 is repeated. On the other hand, if the image of the read scale image data Dm is a black image (Yes at step S6), the program flow goes to step S7.

Thereafter, the operator moves the scanner 20 by one scanning line in the subscan direction indicated by the arrow As, and then, a document image and a scale image of the subsequent one scanning line are read so as to convert them into image data Di composed of the document image data Dg and the scale image data Dm at step S7, and then, the converted image data Di are stored in the RAM 28 at step S8. Thereafter, it is judged at step S9 whether or not the image of the stored scale image data Dm is a white image. If the image of the stored scale image data Dm is not a white image (No at step S9), the program flow goes back to step S7, the operator moves the scanner 20 by one scanning line in the subscan direction indicated by the arrow As, and then, the above image reading process of steps S7 and S8 is repeated. On the other hand, if the image of the read scale image data Dm is a white image (Yes at step S9), the program flow goes to step S10.

Thereafter, one is added to the scanning line parameter n and the sum of the scanning line parameter n and one is stored as the scanning line parameter n at step S10, and then, it is judged at step S11 whether or not the scanning line parameter n is equal to or larger than 50. If the scanning line parameter n is smaller than 50 (No at step S11), the program flow goes back to step S4, and then, the image reading process from step S4 is executed. On the other hand, if the scanning line parameter n is equal to or larger than 50 (Yes at step S11), the program flow goes to step S12, and then, there is executed the image correction process shown in FIG. 8. After executing the image correction process, the main routine shown in FIG. 7 is completed. Thereafter, for example, the corrected document image data $D_G$ are transferred through the external unit interface 53 to the personal computer 60, and then, the personal computer 60 processes the received document image data $D_G$, displays the image of them on a display unit (not shown) which is connected thereto, or outputs them to a printer (not shown) so as to form the image of them on a piece of paper.

Figure 8:
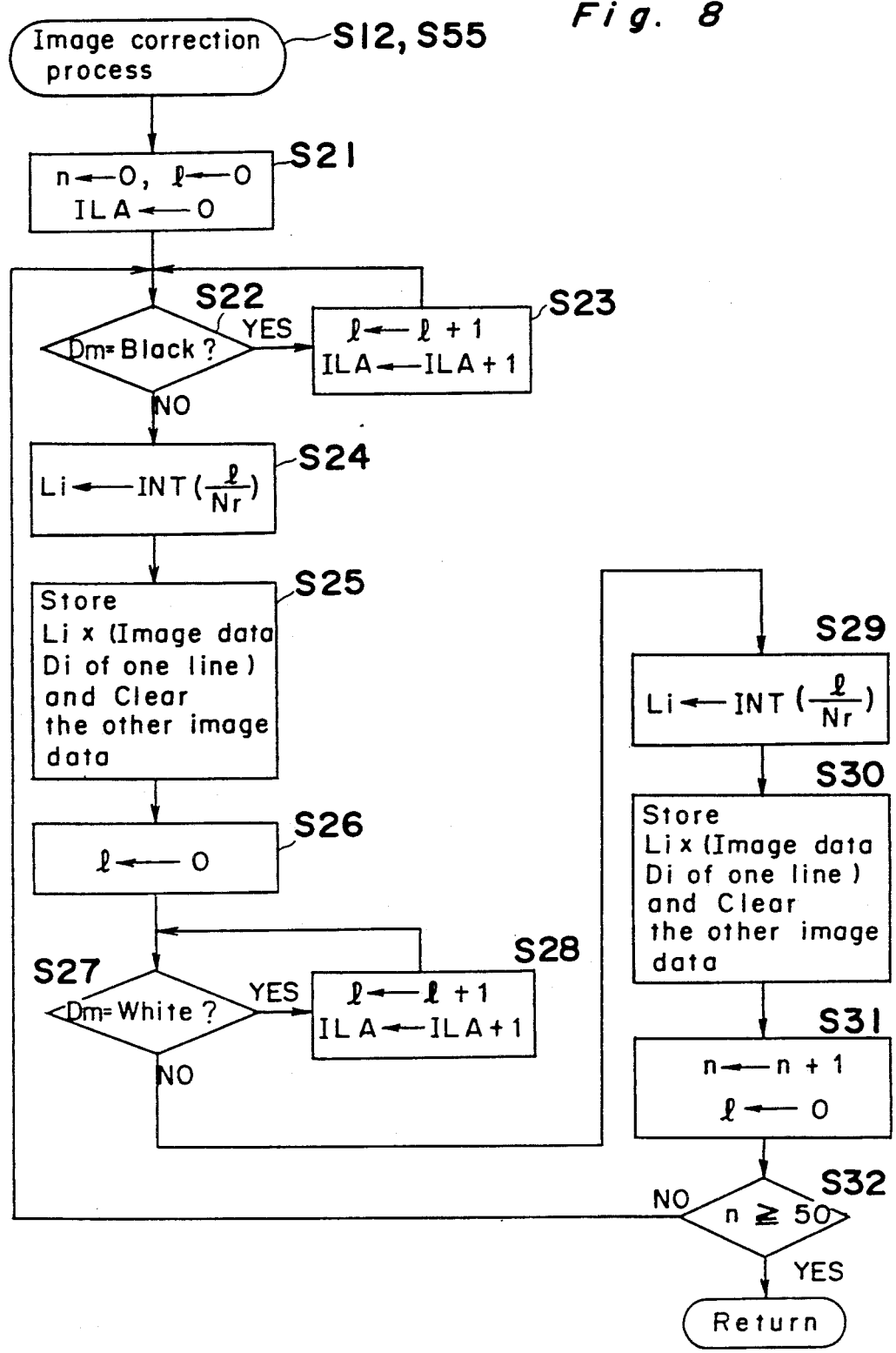
FIG. 8 is a flowchart showing the image correction process of a subroutine of the preferred embodiment.
Figure 9:
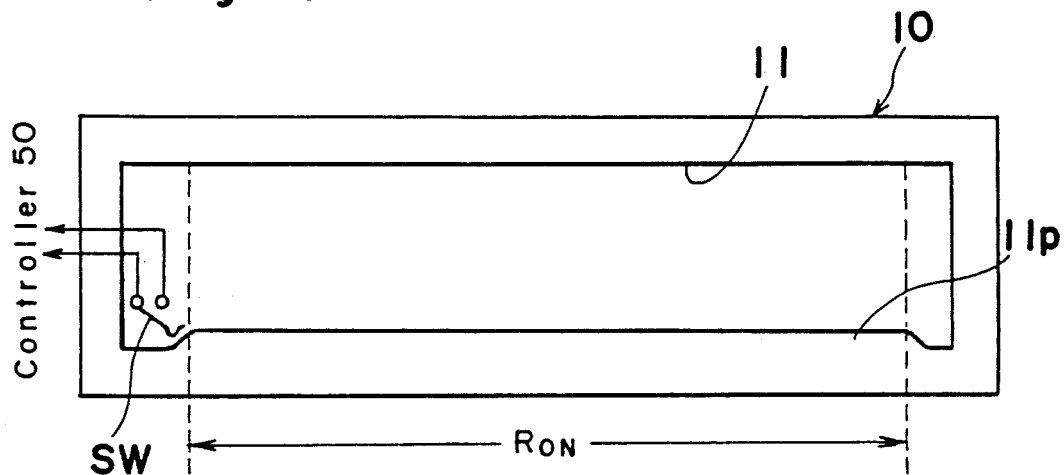
FIG. 9 is a front view showing a composition of window of a ruler body of the image reader of a modification of the preferred embodiment.

FIG. 8 is a flowchart showing a subroutine of the image correction process (steps S12 and S55) shown in FIGS. 7 and 9.

Referring to FIG. 8, first of all, an initialization process is executed at step S21. Namely, in the initialization process, the line parameter n, a storage line parameter l and an image line address ILA are reset to zero, respectively, wherein the image line address ILA represents the address of an area for storing the corrected image data Dic of the RAM 28.

Thereafter, it is judged at step S22 whether or not the image of the scale image data Dm of the read image data Di is a black image. If the image of the scale image data Dm is a black image (Yes at step S22), the program flow goes to step S23. At step S23, one is added to the storage line parameter l, and the sum of one and the storage line parameter l is set as the storage line parameter l. Further, one is added to the image line address ILA, and the sum of one and the image line parameter ILA is stored as the image line parameter ILA. Then, the program flow goes back to step S22. On the other hand, if the image of the scale image data Dm is not black image (No at step S23), the program flow goes to step S24.

At step S24, a line multiple parameter Li is calculated using the following equation (1):

$$Li = INT(l/Nr) \qquad (1)$$

where INT is an integer function, which calculates an integral portion of a value inserted within the parentheses () without counting fractions as one, and Nr is a resolution in a unit of scanning line upon decomposing a black image or a white image. In the present preferred embodiment, the resolution Nr is set at ten.

Thereafter, at step S25, there are generated the line multiple parameter Li times the image data Di of one scanning line indicated by the scanning line parameter n which are stored in the RAM 28, namely, there are generated the image data Di of the Li scanning lines (referred to as multiplied image data hereinafter), and then, the multiplied image data are stored as corrected image data Dic in the RAM 28. Further, there are cleared the other image data Di than the multiplied image data from the RAM 28. Thereafter, the storage line parameter l is reset to zero at step S26, and then, the program flow goes to step S27, it is judged whether or not the image of the scale image data Dm of the read image data Di is a white image. If the image of the scale image data Dm is a white image (Yes at step S27), the program flow goes to step S28. At step S28, one is added to the storage line parameter l, and the sum of one and the storage line parameter l is set as the storage line parameter l. Further, one is added to the image line address ILA, and the sum of one and the image line parameter ILA is stored as the image line parameter ILA. Then, the program flow goes back to step S27. On the other hand, if the image of the scale image data Dm is not white image (No at step S28), the program flow goes to step S29.

At step S29, a line multiple parameter Li is calculated using the above-mentioned equation (1). Thereafter, at step S30, there are generated the line multiple parameter Li times the image data Di of one line indicated by the scanning line parameter n which are stored in the RAM 28, namely, there are generated the multiplied image data Di of the Li scanning lines, and then, the multiplied image data are stored as corrected image data Dic in the RAM 28. Further, there are cleared the other image data Di than the multiplied image data from the RAM 28. Thereafter, the program flow goes to step S31, one is added to the scanning line parameter n, and the sum of one and the scanning line parameter n is stored as the scanning line parameter n. Further, the storage line parameter l is reset to zero.

Thereafter, it is judged at step S32 whether or not the scanning line parameter n is equal to or larger than 50. If the scanning line parameter n is smaller than 50 (No at step S32), the program flow goes back to step S22, and then, the process from step S22 to step S31 is repeated. (On the other hand, if the scanning line parameter n is equal to or larger than 50 (Yes at step S32), the program flow returns to the main routine.

Figure 10:
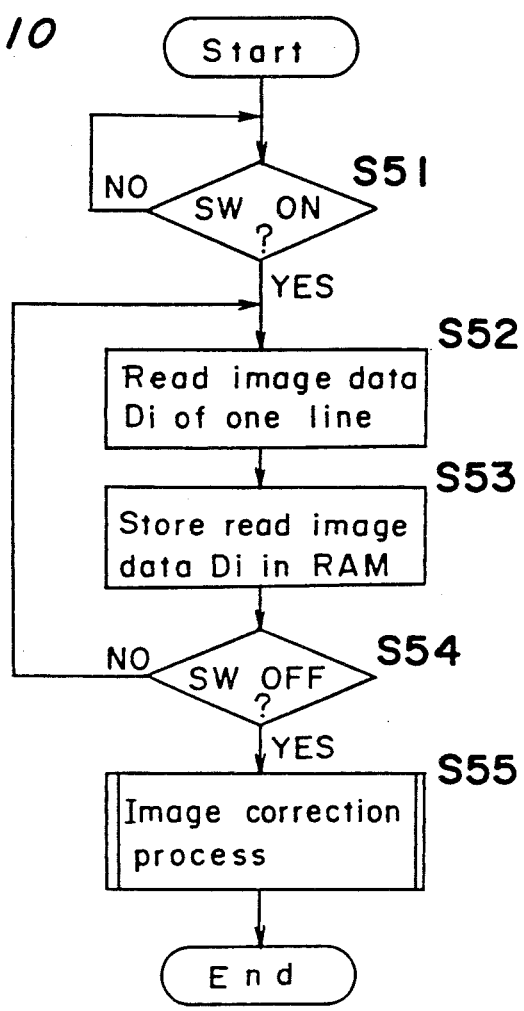
FIG. 10 is a flowchart showing a main routine of an image reading process of a modification in the case of using the ruler body shown in FIG. 9.

FIG. 10 is a flowchart showing a modification of the main routine of the image reading process which is executed by the CPU 26 of the image reading controller 50.

In the modification of the preferred embodiment, as shown in FIG. 9, an analogue switch SW which is operably connected to the controller 50 is mounted on the scanner 20, and a projection 11p projected in the horizontal direction is formed on the window 11 of the ruler body 10 with a length in the longitudinal direction corresponding an area $R_{ON}$ in which a document image is to be read so that the analogue switch SW is turned on over the above-mentioned area $R_{ON}$.

Referring to FIG. 10 showing a main routine of the modification, the operator moves the scanner 20 in the subscan direction indicated by the arrow As by a manual scan, and it is judged at step S51 whether or not the analogue switch SW has been turned on. If the analogue switch SW has not been turned on (No at step S51), the program flow is in a waiting state in the loop of step S51 until the analogue switch SW is turned on (Yes at step S51). If the analogue switch SW has been turned on (Yes at step S51), the program flow goes to step S52, and then, the image data Di of one scanning line including the document image data Dg and the scale image data Dm are read by the CCD image sensor 25. Thereafter, at step S53, the read image data Di are stored in the RAM 28.

Thereafter, it is judged at step S54 whether or not the analogue switch SW has been turned off. If the analogue switch SW has not been turned off (No at step S54), the operator further moves the scanner 20 in the subscan direction indicated by the arrow As by a manual scan, and the program flow goes back to step S52. Then, the process from step S52 to step S53 is repeated. On the other hand, if the analogue switch SW has been turned off (Yes at step S54), the image correction process shown in FIG. 8 is executed at step S55, and thereafter, the image reading process is completed.

According to the image reader of the present preferred embodiment, the moving position of the scanner 20 or the CCD image sensor 25 is detected by only the process for processing the electric signals. Therefore, the moving position thereof can be detected with a precision extremely higher than that of the conventional image reader comprising the mechanical system. Even though the resolution of the image reader becomes extremely high, image data correctly corresponding to an original document image can be obtained more faithfully and more stably.

Furthermore, in the image reader of the present preferred embodiment, since it is unnecessary to provide the conventional rotary encoder having the rotation mechanism, the scanner 20 can be further miniaturized as compared with the conventional scanner, and also the composition thereof can be simplified, resulting in a cheaper scanner or a cheaper image reader.

It is to be noted that the present invention is not limited to the description of the preferred embodiment and the drawings attached herewith, and the present invention can includes various kinds of modifications without departing from the scope of the claims.

For example, the scale lines of the scale 13 may be printed at equal pitches between the adjacent scale lines, each pitch being smaller than 1 mm. In this case, image information read by the image reader can be corrected with a high precision as compared with the case of the conventional image reader.

The scale lines of the scale 13 may be printed on the bottom surface 10b of the ruler body 10 so as to be inclined with an inclination angle of 45° to the longitudinal sides of the window 12, as shown in alternate long and short dash lines of FIG. 1. In this case, the read inclined scale lines are corrected so as to become scale lines which are perpendicular to the longitudinal sides of the window 12, and image information read by the image reader can be corrected with an extremely high precision as compared with the case of the conventional image reader.

The pitches between the adjacent scale lines of the scale 13 and the above-mentioned inclination angle are not limited to the above case, and may be determined according to the specifications of the image reader.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image reader for reading a document image by manually moving an image sensor for optically reading said document image in a manual scan direction, converting said read document image into document image data, and outputting said converted document image data to an external unit, said image reader comprising:
    a ruler body having a bottom surface and a top surface and including an image reading window for viewing said document image therethrough, said image reading window being formed on said bottom surface so as to be opened to said top surface, said image reading window having plural scale lines printed with predetermined equal pitches in said manual scan direction on said bottom surface, some of said scale lines being adjacent to one another;
    a scanner mounted on said ruler body for movement in said manual scan direction, said scanner including said image sensor for and converting reading said document image and said plural scale lines into document image data and scale image data, respectively, said image sensor being mounted on said scanner so as to receive light reflected from said image reading window and said plural scale lines; and
    image correction means, coupled to said scanner, for correcting said document image data converted by said image sensor according to said scale image data so as to provide further document image data corresponding to said document image with predetermined equal pitches between adjacent ones of said scale lines of said converted scale image data.

2. The image reader as claimed in claim 1, wherein each of said plural scale lines has a longitudinal length in a direction perpendicular to said manual scan direction.

3. The image reader as claimed in claim 1, wherein said plural scale lines are printed so as to be inclined by an acute angle to a longitudinal side of said image reading window parallel to said manual scan direction.

4. The image reader as claimed in claim 3, wherein said acute angle is 45°.

5. The image reader as claimed in claim 1, wherein each of said plural scale lines is a black image, each image between said adjacent scale lines in said manual scan direction is a white image; and
said image correction means corrects said document image data converted by said image sensor according to said scale image data converted by said image sensor so that the width in said manual scan direction of each of said plural scale lines becomes substantially equal to that of said each image between said adjacent scale lines.

6. The image reader as claimed in claim 1, wherein said image correction means corrects said document image data converted by said image sensor according to said scale image data converted by said image sensor depending on a resolution in said manual scan direction of said image sensor.

7. The image reader as claimed in claim 6, wherein said image correction means corrects said document image data converted by said image sensor according to said scale image data converted by said image sensor by executing every black or white image data of said scale image data, a process including the following steps of:
calculating the following line multiple parameter Li using the following equation:

$$Li = INT(l/Nr)$$

where INT is an integer function, which calculates an integral portion of a value inserted within the parentheses ( ) without counting fractions as one, and
Nr is a predetermined resolution of said image sensor in a unit of scanning line upon decomposing a black image or a white image; and
obtaining said line multiple parameter times said document image data of one scanning line in a main direction perpendicular to said manual scan direction.

8. The image reader as claimed in claim 1, wherein an image reading process executed by said image sensor is completed when a predetermined number of said plural scale lines has been counted.

9. The image reader as claimed in claim 1, further comprising an analogue switch for detecting an area where said document image to be read is formed, wherein an image reading process executed by said image sensor is started if said analogue switch is turned on, and said image reading process is completed if said analogue switch is turned off.

* * * * *

UNITED STATES PATENT AND TRADEMARK OFFICE
CERTIFICATE OF CORRECTION

PATENT NO. : 5,058,188
DATED : 15 October 1991
INVENTOR(S) : YONEDA

It is certified that error appears in the above-identified patent and that said Letters Patent is hereby corrected as shown below:

On the Title Page, in data item "[73] Assignee:", change

"Kabushiki Kaisha" to

--Sharp Kabushiki Kaisha--.

Signed and Sealed this

Sixteenth Day of March, 1993

Attest:

STEPHEN G. KUNIN

*Attesting Officer*    Acting Commissioner of Patents and Trademarks